United States Patent
Sharma et al.

(10) Patent No.: US 6,678,422 B1
(45) Date of Patent: Jan. 13, 2004

(54) METHOD AND APPARATUS FOR IMAGE DATA COMPRESSION WITH LOW MEMORY REQUIREMENT

(75) Inventors: Chandan Dev Sharma, Sunnyvale, CA (US); Bernd Meyer, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 681 days.

(21) Appl. No.: 09/651,991

(22) Filed: Aug. 30, 2000

(51) Int. Cl.⁷ .................................................. G06K 9/36
(52) U.S. Cl. ...................................................... 382/240
(58) Field of Search ................................ 382/232, 236, 382/238, 240, 242, 248, 250; 348/884.1, 394.1–395.1, 400.1–404.1, 407.1–416.1, 420.1–421.1, 425.2, 430.1–431.1; 375/240.02–240.03, 240.11–240.16, 240.18–240.2, 240.22–240.25; 341/51, 63, 65, 67, 79, 101; 708/203, 300, 307–308, 313, 316–317, 400–405

(56) References Cited

U.S. PATENT DOCUMENTS

| | | | | |
|---|---|---|---|---|
| 5,321,776 A | * | 6/1994 | Shapiro | 382/240 |
| 5,659,363 A | * | 8/1997 | Wilkinson | 375/240.11 |
| 6,215,910 B1 | * | 4/2001 | Chaddha | 382/253 |
| 6,222,941 B1 | * | 4/2001 | Zandi et al. | 382/232 |
| 6,360,019 B1 | * | 3/2002 | Chaddha | 382/253 |
| 6,404,923 B1 | * | 6/2002 | Chaddha | 382/224 |
| 6,591,017 B1 | * | 7/2003 | Fukuhara et al. | 382/240 |

OTHER PUBLICATIONS

Christos Chrysafis and Antonio Ortega, "Line Base, Reduced Memory, Wavelet Image Compression", Proc IEEE Data Compression Conference, (Snowbird, Utah) pp. 398–407, 1998.

Analog Devices Datasheet for the ADV611/ADV612 Circuits, pp. 3–7 (1999).

* cited by examiner

Primary Examiner—Jose L. Couso
(74) Attorney, Agent, or Firm—Girard & Equitz LLP

(57) ABSTRACT

A method and apparatus for performing a multi-stage wavelet transform on a block of image data, using a smaller memory than would be required to implement an equivalent conventional multi-stage wavelet transform on the same block, and a method and apparatus for performing compression on a block of image data by performing a multi-stage wavelet transform on the block, quantizing coefficients resulting from the multi-stage wavelet transform, and performing entropy encoding on the quantized coefficients. Typically, the input image data is generated by a document scanner, and is compressed in a manner allowing fast decompression (by employing simple entropy encoding) and imposing low memory requirements. The data is compressed by operating a first circuit to perform at least two consecutive horizontal wavelet transform stages on a block of the image data, quantizing and entropy encoding at least a first block of the resulting coefficients indicative of relatively high spatial frequency information ("high frequency coefficients") and writing to a memory a second block of the resulting coefficients indicative of relatively low spatial frequency information ("low frequency coefficients"), reading the low frequency coefficients from memory and operating a second circuit to perform at least one vertical wavelet transform stage on the low frequency coefficients, and quantizing and entropy encoding at least some of the resulting coefficients.

26 Claims, 4 Drawing Sheets

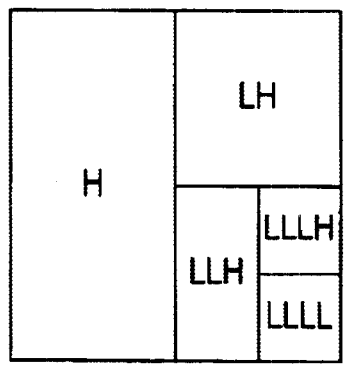

FIG. 2
(PRIOR ART)

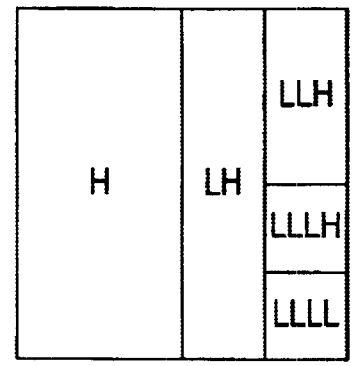

FIG. 4

$$\begin{bmatrix} 6 & 2 & -1 & 0 & 0 & 0 & 0 & 0 & -1 & 2 \\ -2 & 4 & -2 & 0 & 0 & 0 & 0 & 0 & 0 & 0 \\ -1 & 2 & 6 & 2 & -1 & 0 & 0 & 0 & 0 & 0 \\ 0 & 0 & -2 & 4 & -2 & 0 & 0 & 0 & 0 & 0 \\ 0 & 0 & -1 & 2 & 6 & 2 & -1 & 0 & 0 & 0 \\ 0 & 0 & 0 & 0 & -2 & 4 & -2 & 0 & 0 & 0 \\ 0 & 0 & 0 & 0 & -1 & 2 & 6 & 2 & -1 & 0 \\ 0 & 0 & 0 & 0 & 0 & 0 & -2 & 4 & -2 & 0 \\ -1 & 0 & 0 & 0 & 0 & 0 & -1 & 2 & 6 & 2 \\ -2 & 0 & 0 & 0 & 0 & 0 & 0 & 0 & -2 & 4 \end{bmatrix}$$

Forward Transform Matrix

FIG. 7

$$\begin{bmatrix} 4 & -2 & 0 & 0 & 0 & 0 & 0 & 0 & 0 & -2 \\ 2 & 6 & 2 & -1 & 0 & 0 & 0 & 0 & 0 & -1 \\ 0 & -2 & 4 & -2 & 0 & 0 & 0 & 0 & 0 & 0 \\ 0 & -1 & 2 & 6 & 2 & -1 & 0 & 0 & 0 & 0 \\ 0 & 0 & 0 & -2 & 4 & -2 & 0 & 0 & 0 & 0 \\ 0 & 0 & 0 & -1 & 2 & 6 & 2 & -1 & 0 & 0 \\ 0 & 0 & 0 & 0 & 0 & -2 & 4 & -2 & 0 & 0 \\ 0 & 0 & 0 & 0 & 0 & -1 & 2 & 6 & 2 & -1 \\ 0 & 0 & 0 & 0 & 0 & 0 & 0 & -2 & 4 & -2 \\ 2 & -1 & 0 & 0 & 0 & 0 & 0 & -1 & 2 & 6 \end{bmatrix}$$

Inverse Transform Matrix

FIG. 8

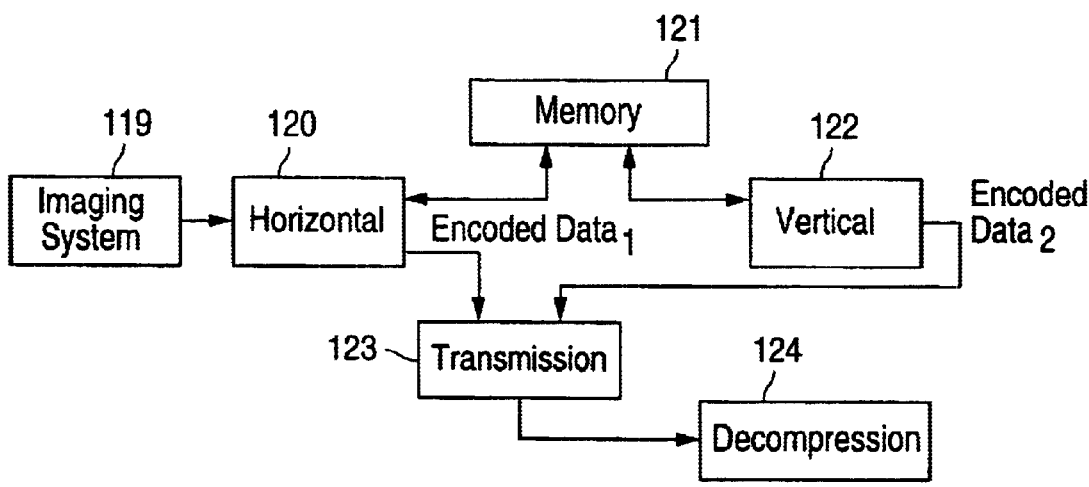

FIG. 9

METHOD AND APPARATUS FOR IMAGE DATA COMPRESSION WITH LOW MEMORY REQUIREMENT

FIELD OF THE INVENTION

The present invention relates to methods and apparatus for performing compression on image data, by wavelet transformation of the image data followed by quantization and encoding. In preferred embodiments, the invention is a method and apparatus for performing compression on image data (e.g., image data generated by a document scanner) in a manner allowing fast decompression, by wavelet transformation of the image data (in a manner imposing low memory requirements) followed by quantization and encoding.

BACKGROUND OF THE INVENTION

It is well known to perform image compression on digital image data to generate a reduced set of compressed data from which each original image (determined by the uncompressed data) can be reconstructed without loss of essential features. An inverse transformation (decompression) can be applied to compressed image data (e.g., following transmission or storage of the compressed image data) to recover data indicative of each image determined by the original data (or a reasonable facsimile of each such image).

In color imaging devices, each pixel of an image is determined by three color component values (e.g., red, green, and blue values). The three sets of color component values that determine an image are typically processed separately. Digital data that determines a pixel of a color image comprises three color component words, each of which is a multi-bit digital word determining a color component sample (e.g., a red, green, or blue sample of an analog image representation).

Throughout the specification, including in the claims, "block" denotes an array of N×M samples (N columns and M rows of samples, where N and M are integers) of a given color component, and "word" denotes a multi-bit digital word that determines a color component sample (e.g., a blue sample of an analog image representation) or a coefficient generated by performing a transform on a set of color component samples (e.g., one of the coefficients generated by performing a discrete cosine transform or wavelet transform on a row or column of blue samples of an analog image representation).

It should be appreciated that throughout this disclosure, the orthogonal dimensions of a block of data are arbitrarily denoted as "rows" and "columns." Thus, the rows and columns of a block can equally well be denoted as "columns" and "rows," respectively, Similarly, a method in which a "horizontal" filtering operation is performed on rows of a block (to generate filtered data) and a "vertical" filtering operation is then performed on columns of the filtered data can equivalently be described as a method in which a "vertical" filtering operation is performed on columns of the same block (if the rows are relabeled as columns) to generate the same filtered data and a "horizontal" filtering operation is then performed on rows of the filtered data. Thus, a method comprising sequential horizontal and vertical filtering operations (each vertical filtering operation following a horizontal filtering operation) can equivalently be described as a method comprising sequential vertical and horizontal filtering operations (each horizontal filtering operation following a vertical filtering operation).

Typical methods for performing lossy image compression on image data include three steps: an image transform step which generates transform coefficients by performing a transform on the image data (e.g., a discrete cosine transform or wavelet transform); followed by a quantization step which replaces each transform coefficient with a quantized coefficient comprising fewer bits on the average (e.g., a scalar quantization step in which each of the coefficients is divided by the quantization step size); and finally an entropy encoding step in which the quantized coefficients are replaced by code words (e.g., a Huffman encoding or arithmetic encoding operation, in which the quantized coefficients that occur more frequently are replaced by relatively small code words and the quantized coefficients that occur less frequently are replaced by relatively large code words).

Decompression of compressed image data is the inverse of compression, and includes an initial decoding step (in which the entropy encoded code words that comprise the compressed data are decoded); followed by an inverse quantization step (in which inverse quantization is performed on the decoded data); and finally an inverse transform step (performed on the data resulting from the inverse quantization) which reconstructs the original image data.

With reference to FIG. 1, in a conventional three-stage wavelet transform, a "horizontal" wavelet transform is initially performed on each row (sometimes referred to as a "line") of a block (typically an M×M block) of input image data (block 1 of FIG. 1) to convert each row into two vectors, $z_L$ and $z_H$, each comprising M/2 coefficients (coefficient words). All the vectors $z_L$ together define coefficient block "L" (having M rows and M/2 columns of coefficients) which is indicative of relatively low spatial frequency information, and the vectors $z_H$ together define a coefficient block "H" (having M rows and M/2 columns of coefficients) which is indicative of relatively high spatial frequency information. This horizontal wavelet transform is equivalent to passing the input block 1 through a "high pass" transform filter 2 and a "low pass" transform filter 4, passing the output of filter 2 through decimation filter 3 (in which it undergoes decimation which reduces its sampling frequency by a factor of two) to generate block "H", and passing the output of filter 4 through decimation filter 5 (in which it undergoes decimation which reduces its sampling frequency by a factor of two) to generate block "L."

Then, another wavelet transform (a "vertical" wavelet transform) is performed on each column of block "L" (each column comprising M coefficients indicative of relatively low spatial frequency information). Since the "vertical" wavelet transform filters columns rather than rows, it requires that block "L" has been stored in a memory and read out from the memory on a column by column basis to perform the vertical transform. Each column of block "L" (sometimes referred to as a "line") is converted into two vectors, $z_{LL}$ and $z_{LH}$, each comprising M/2 coefficients. All the vectors $z_{LL}$ together define coefficient block "LL" (having M/2 rows and M/2 columns of coefficients, and indicative of the relatively low spatial frequency information of block "L"), and the vectors $z_{LH}$ together define coefficient block "LH" (having M/2 rows and M/2 columns of coefficients, and indicative of the relatively high spatial frequency information of block "L"). This vertical wavelet transform is equivalent to passing block "L" through a "high pass" transform filter 6 and a "low pass" transform filter 8, passing the output of filter 6 through decimation filter 7 (in which it undergoes decimation which reduces its sampling frequency by a factor of two) to generate block "LH", and passing the output of filter 8 through decimation filter 9 (in which it undergoes decimation which reduces its sampling frequency by a factor of two) to generate block "LL."

Then, another wavelet transform (a second "horizontal" wavelet transform) is performed on each row of block LL. Since this horizontal wavelet transform filters rows rather than columns, it requires that block LL has been stored in memory and read out from memory on a row by row basis to perform the filtering. Each row of block LL is converted into two vectors, $z_{LLL}$ and $z_{LLH}$, each comprising M/4 coefficients. All the vectors $z_{LLL}$ together define coefficient block "LLL" (having M/4 rows and M/2 columns of coefficients, and indicative of the relatively low spatial frequency information of block LL), and the vectors $z_{LLH}$ together define coefficient block "LLH" (having M/4 rows and M/2 columns of coefficients, and indicative of the relatively high spatial frequency information of block LL). This horizontal wavelet transform is equivalent to passing block LL through a "high pass" transform filter 10 and a "low pass" transform filter 12, passing the output of filter 10 through decimation filter 11 (in which it undergoes decimation which reduces its sampling frequency by a factor of two) to generate block "LLH", and passing the output of filter 12 through decimation filter 13 (in which it undergoes decimation which reduces its sampling frequency by a factor of two) to generate block "LLL."

If an additional vertical wavelet transform is performed on block LL, block LLL is transformed into a block "LLLL" (having M/4 rows and M/4 columns of coefficients, and indicative of the relatively low spatial frequency information of block LLL) and a block "LLLH" (having M/4 rows and M/4 columns of coefficients, and indicative of the relatively high spatial frequency information of block LLL).

Thus, a conventional four stage wavelet transform method (whose first three stages are those described with reference to FIG. 1, and whose final stage is a second vertical wavelet transform) transforms the original image data block (e.g., block 1) into five coefficient blocks. FIG. 2 is a diagram representing these five coefficient blocks (labeled H, LH, LLH, LLLH, and LLLL in FIG. 2). Block H comprises coefficients that are indicative of those features the original image having the highest spatial frequencies, and block LLLL comprises coefficients that are indicative of those features of the original image having the lowest spatial frequencies. Block H is generated during the first (horizontal) wavelet transform, block LH is generated during the second (vertical) wavelet transform, block LLH is generated during the third (horizontal) wavelet transform, and blocks LLLH and LLLL are generated during the fourth (vertical) wavelet transform.

In order to perform a complete image compression operation on the original image data, the coefficients comprising the blocks of FIG. 2 are quantized and then subjected to entropy encoding (as noted above).

The number of conventional wavelet transform stages that are included in conventional image compression operation depends on the degree of compression that is desired, with more transform stages resulting in greater compression.

Conventional image compression, in which a multi-stage wavelet transform is performed on an N×M block of image data (in which each of the "N" rows comprises "M" words and each of the "M" columns comprises "N" words), is expensive to implement since a large buffer memory is required to implement each of its vertical transform stages that follows a horizontal transform stage (and each of its horizontal transform stages that follows a vertical transform stage). If the first stage is a horizontal stage, the first stage produces two N×M/2 blocks of coefficients, the second stage is a vertical stage which operates on columns (each comprising N words) of one of the N×M/2 blocks, the third stage is a horizontal stage which operates on rows (each comprising M/2 words) of an N/2×M/2 block produced in the second stage, and so on. Thus, even if the vertical and horizontal stages are performed recursively (using one horizontal transform circuit, one vertical transform circuit, and a memory to which both transform circuits can write and from which both transform circuits can read), the memory must have the capacity to store at least an N×M/2 block. In accordance with the present invention, image compression (in which a multi-stage wavelet transform is performed on an N×M block of image data) can be performed using a smaller memory than would be required to implement an equivalent conventional image compression operation on the same input image data block.

SUMMARY OF THE INVENTION

An important aspect of the invention is a method and apparatus for performing a multi-stage wavelet transform on an N×M block of image data, using a smaller memory than would be required to implement an equivalent conventional multi-stage wavelet transform on the same image data block. Another aspect of the invention is a method and apparatus for performing compression on such a block of image data, including by performing a multi-stage wavelet transform on the block, quantizing coefficients resulting from the multi-stage wavelet transform, and performing entropy encoding on the quantized coefficients.

In some preferred embodiments, the input image data is image data that has been generated by a document scanner, and the input image data is compressed in a manner allowing fast decompression (preferably with the inverse wavelet transform performed using integer operations), by a compression method that performs multi-stage wavelet transformation on the input image data (in a manner imposing low memory requirements). Preferably, fast decompression is made possible by employing simple entropy encoding (and optionally also by employing integer operations to perform the wavelet transform) in the compression operation. Preferably, the input image data is compressed with good quality, in the sense that the peak signal to noise ratio ("PSNR") of the compressed data is at least substantially equal to 40 dB. In some implementations, each color component of the compressed data has a bit rate in the range from 2 to 3 bits per pixel (where each pixel of the input data comprises three 8-bit color component words).

Some embodiments of the inventive method for compressing image data include the steps of: operating a first circuit to perform at least two consecutive horizontal wavelet transform stages on a block of the image data, quantizing and entropy encoding at least a first block of the resulting coefficients which are indicative of relatively high spatial frequency information ("high frequency coefficients") and writing to a memory a second block of the resulting coefficients which are indicative of relatively low spatial frequency information ("low frequency coefficients"), reading columns of the low frequency coefficients from the memory and operating a second circuit to perform at least one vertical wavelet transform stage (or two or more consecutive vertical wavelet transform stages) on the low frequency coefficients read from the memory, and quantizing and entropy encoding at least some of the resulting coefficients.

The image data compression apparatus of the invention includes a random access memory (RAM), and a first circuit and a second circuit coupled to the memory. The first circuit is configured to perform at least two consecutive horizontal wavelet transform stages on a block of image data, quantize and entropy encode at least a first block of the resulting coefficients which are indicative of relatively high spatial frequency information ("high frequency coefficients"), and write to the memory a second block of the resulting coefficients which are indicative of relatively low spatial frequency information ("low frequency coefficients"). In preferred embodiments, the second circuit is configured to read columns of the low frequency coefficients from the memory, to perform at least one vertical wavelet transform stage (i.e., one vertical wavelet transform stage, or two or more consecutive vertical wavelet transform stages) on the low frequency coefficients, and to quantize and entropy encode at least some of the resulting coefficients.

In other implementations of the inventive apparatus, the first and second circuits are configured to operate recursively on data (with any number of cycles), in the sense that one of the circuits (during each of the cycles) operates on a subset of the data generated by the other (after such other circuit has written the subset to the memory). For example, in some recursive implementations, the first circuit performs two consecutive horizontal wavelet transform stages (in a first cycle), the second circuit then (in a second cycle) performs at least one vertical wavelet transform stage (on data generated in the first cycle), and the first circuit then (in a third cycle) performs at least one horizontal wavelet transform stage (e.g., two consecutive horizontal wavelet transform stages) on data generated in the second cycle. In one class of embodiments, the second circuit performs at least one vertical wavelet transform stage on the low frequency coefficients, quantizes and entropy encodes at least a first set of the resulting coefficients which are indicative of relatively high spatial frequency information (regarding the low frequency coefficients), and writes to the memory a second set of the resulting coefficients which are indicative of relatively low spatial frequency information (regarding the low frequency coefficients). In the latter embodiments, the first circuit is configured to read from the memory (on a row by row basis) the second set of coefficients, to perform at least one horizontal wavelet transform stage on the second set of coefficients, and to quantize and entropy encode at least some of the resulting coefficients.

In some preferred embodiments of the inventive method and apparatus, each wavelet transform is a 3–5 wavelet transform.

As explained above, in the present disclosure, the terms "horizontal" and "vertical" are arbitrary in the sense that "horizontal" and "vertical" operations are performed respectively on "rows" and "columns" of data, and first and second orthogonal dimensions of a block of data are arbitrarily denoted respectively as "rows" and "columns or "columns" and "rows."

BRIEF DESCRIPTION OF THE DRAWINGS

FIG. 2 is a diagram representing coefficients generated during operation of the FIG. 1 circuit to compress a block of image data.

FIG. 4 is a diagram representing coefficients generated during operation of the FIG. 3 circuit to compress a block of image data.

FIG. 7 is a matrix of coefficients that are employed (e.g., by circuit 34 of FIG. 5 or circuit 61 of FIG. 6) to perform a 3–5 wavelet transform on a block of data.

FIG. 8 is a matrix of coefficients that are employed to perform the inverse of the 3–5 wavelet transform of FIG. 7 on a block of data.

FIG. 9 is a block diagram of an alternative embodiment of the inventive apparatus.

DETAILED DESCRIPTION OF THE PREFERRED EMBODIMENTS

Most conventional document scanners do not implement image data compression, because of the need for high quality of reconstructed images (i.e., the need to avoid quality reduction due to compression and decompression), the need for rapid image data processing (i.e., the need to avoid lengthy compression and decompression processing times that would offset the time savings achieved by transmitting compressed rather than uncompressed data), and the need to minimize manufacturing cost (e.g., the need to avoid use of expensive memory circuitry to implement compression).

Approximately 120 Mbytes of uncompressed image data results from scanning of a typical letter-sized (11 in×8.5 in) document at 600 d.p.i. Using a USB transmission link rated at 1 Mbyte/sec, a very long time (two minutes) is required to transmit such data. A document scanner implementing a preferred embodiment of the invention reduces such transmission time by a factor of three to four (where each color component of the compressed data generated in accordance with the invention has a bit rate in the range from two to three bits per pixel, where each pixel of the input data comprises three eight-bit color component words), while providing reconstructed data (after both compression and decompression) having good quality (peak signal to noise ratio of about 40 dB), allowing the compressed data to be rapidly decompressed (as a result of simple entropy encoding during compression), and implementing compression using a lower capacity memory than required in the prior art.

Figure 3:
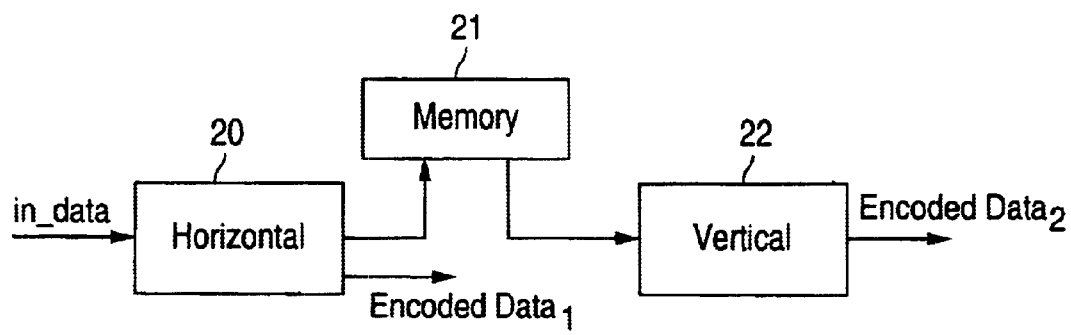
FIG. 3 is a block diagram of a first preferred embodiment of the inventive apparatus.

FIG. 3 is a block diagram of a preferred embodiment of the inventive image data compression apparatus. This embodiment includes random access memory (RAM) 21, first circuit 20, and second circuit 22. First circuit 20 is coupled to memory 21 and configured to perform at least two (typically, exactly two) consecutive horizontal wavelet transform stages on a block of image data (identified as "in_data" in FIG. 3) to generate coefficients, to quantize and entropy encode a first block of the coefficients which are indicative of relatively high spatial frequency information ("high frequency coefficients") to generate compressed data (identified as "Encoded data$_1$" in FIG. 3), and to write to memory 21 (on a row by row basis) a second block of the coefficients which are indicative of relatively low spatial frequency information ("low frequency coefficients"). Second circuit 22 is coupled to memory 21 and configured to read columns of the low frequency coefficients from memory 21, to perform one or more (typically, two) consecutive vertical wavelet transform stages on the low frequency coefficients, and to quantize and entropy encode the resulting coefficients to generate additional compressed data (identified as "Encoded data$_2$" in FIG. 3).

With reference to FIG. 4, a preferred implementation of the FIG. 3 apparatus can implement image data compression (including a four-stage wavelet transform) as follows. Circuit 20 initially performs a first horizontal wavelet transform on each row of an M×M block of input image data ("in_data") to generate a coefficient block "L" (having M rows and M/2 columns of coefficients) which is indicative of relatively low spatial frequency information, and a coefficient block "H" (having M rows and M/2 columns of coefficients) which is indicative of relatively high spatial frequency information. Then, circuit 20 performs a second horizontal wavelet transform on each row of block L to generate a coefficient block "LL" (having M rows and M/4 columns of coefficients) which is indicative of relatively low spatial frequency information of block L, and a coefficient block "LH" (having M rows and M/4 columns of coefficients) which is indicative of relatively high spatial frequency information of block L. Circuit 20 performs quantization and entropy encoding on blocks H and LH and outputs the resulting data (i.e., as "Encoded data[1]"), and writes the M×M/4 block of LL data to memory 21 (on a row by row basis).

Then, circuit 22 reads this data from memory 21 (on a column by column basis), and performs a first vertical wavelet transform to generate a coefficient block "LLL" (having M/2 rows and M/4 columns of coefficients) which is indicative of relatively low spatial frequency information of the data read from memory, and a coefficient block "LLH" (having M/2 rows and M/4 columns of coefficients) which is indicative of relatively high spatial frequency information of the data read from memory. Then, circuit 22 performs a second vertical wavelet transform on each column of block LLL to generate a coefficient block LLLL (having M/4 rows and M/4 columns of coefficients) which is indicative of relatively low spatial frequency information of block LLL, and a coefficient block LLLH (having M/4 rows and M/4 columns of coefficients) which is indicative of relatively high spatial frequency information of block LLL. Circuit 22 performs quantization and entropy encoding on blocks LLH and LLLH (and optionally also block LLLL) and outputs the resulting data (i.e., as "Encoded data$_2$"). Alternatively, circuit 22 simply outputs block LLLL (without quantizing or entropy encoding it) along with the quantized and encoded coefficients of blocks LLLH and LLH.

Figure 1:
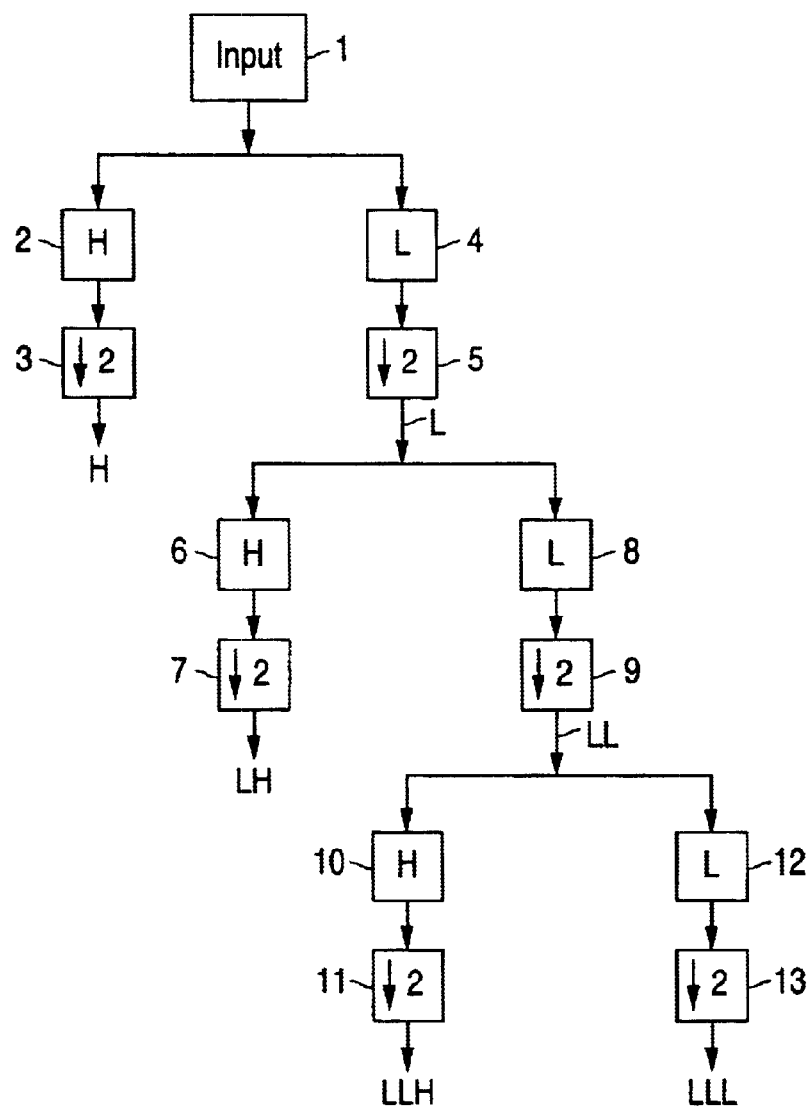
FIG. 1 is a block diagram of a conventional system for performing lossy compression of image data.

As a result, the FIG. 3 apparatus transforms the original image data block into five coefficient blocks, which are represented in FIG. 4 as coefficient blocks H, LH, LLH, LLLH, and LLLL. The FIG. 3 apparatus generates these coefficient blocks using a relative small capacity memory 21 (capable of storing an M×M/4 block of data). In contrast, the conventional apparatus (described above with reference to FIG. 1) employed to generate the coefficient blocks of FIG. 2 requires a larger capacity memory (capable of storing an M×M/2 block of data "L" resulting from a first horizontal wavelet transform).

In some implementations of the FIG. 3 apparatus, circuit 22 performs at least one vertical wavelet transform stage on a block of low frequency coefficients that it reads from memory 21, and quantizes, entropy encodes, and outputs a first set of the resulting coefficients (which are indicative of relatively high spatial frequency information of the low frequency coefficients), and also writes to memory 21 a second set of the resulting coefficients (which are indicative of relatively low spatial frequency information of the low frequency coefficients). In such implementations, circuit 20 is configured to read from memory 21 (on a row by row basis) the second set of coefficients, to perform at least one horizontal wavelet transform stage on the second set of coefficients, and then to quantize and entropy encode the resulting coefficients.

In other embodiments, the invention is an image data compression apparatus including horizontal and vertical processing circuits configured to operate recursively on data (with any number of cycles), in the sense that one of circuits (during each of the cycles) operates on a subset of wavelet transform coefficients generated by the other one of circuits (after such other one of the circuits has written the subset to a memory).

With reference again to FIG. 3, preferably, circuit 22 is controllable so that it can be disabled, or operated in a mode in which it performs a single vertical wavelet transform (rather than two consecutive vertical wavelet transform stages) on a block read from memory 21. Such controllable implementations allow the user to control the type of compression performed on raw data, and thus to control the complexity of the decompression that is required to reconstruct the original data. Implementation of the forward transform with fewer wavelet transform stages (during compression) implies that decompression can be accomplished with lower complexity.

Figure 5:
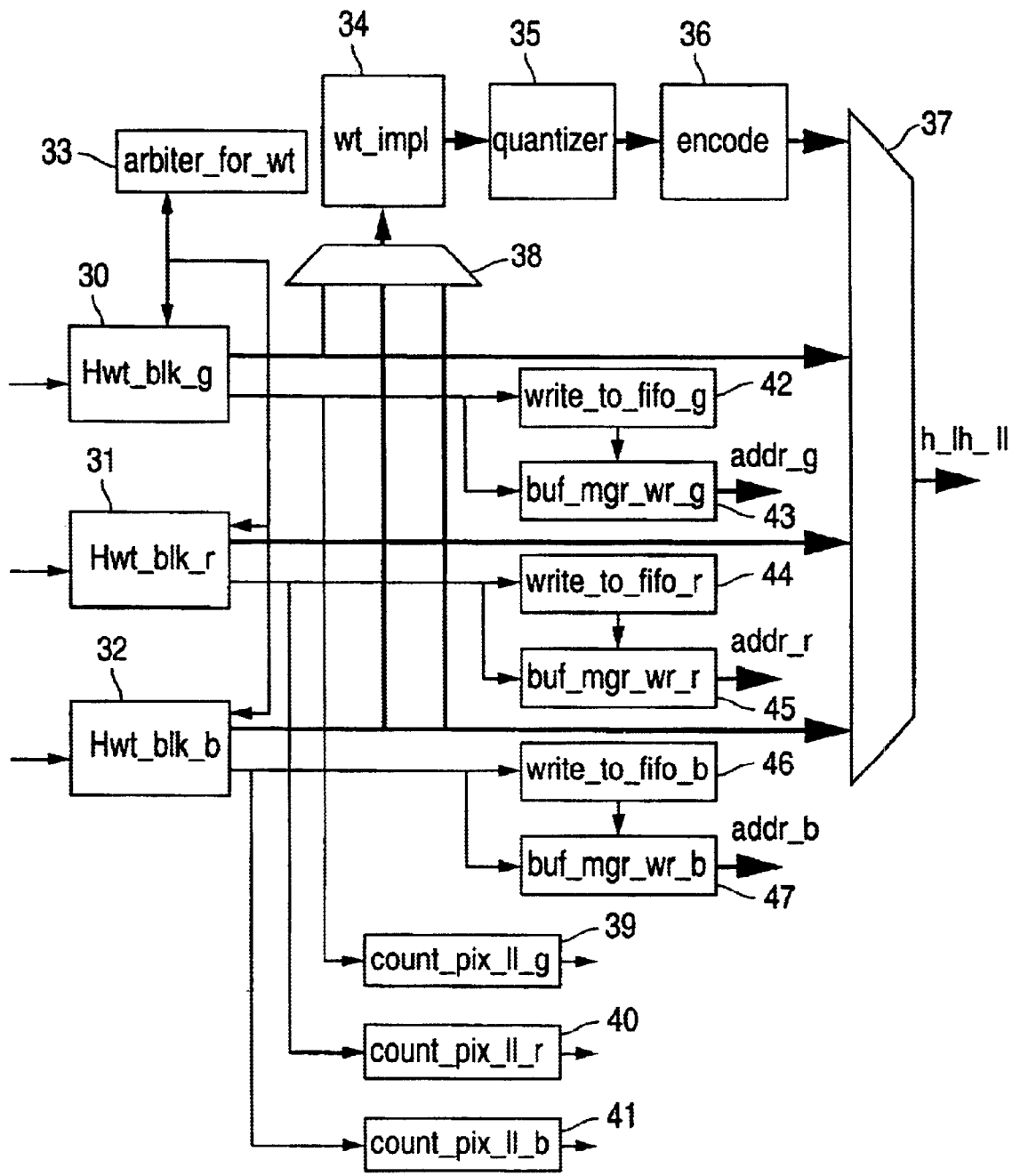
FIG. 5 is a block diagram of a preferred implementation of circuit 20 of the FIG. 3 apparatus.

FIG. 5 is a block diagram of a preferred implementation of circuit 20 of the FIG. 3 apparatus. The FIG. 5 circuit comprises buffer and control logic circuits 30, 31, and 32, arbitration circuit 33, wavelet transform circuit 34, quantizer 35, entropy encoder 36, multiplexers 37 and 38, counters 39, 40, and 41, logic circuits 42, 44, and 46, and address generation circuits 43, 45, and 47, connected as shown. Wavelet transform circuit 34 is an arithmetic unit which generates a set of wavelet transform coefficients, decimated by a factor of two (relative to the sample rate of the data input to circuit 34), in response to each row of each block of data input thereto. The FIG. 5 circuit is shared by all three color components, with buffer 30 coupled to receive the green components of an input block, buffer 31 coupled to receive the red components of the block, and buffer 32 coupled to receive the blue components of the block. It is assumed that the input block is interleaved, in the sense that a line of color components of a first color (e.g., green) is followed by a line of color components of a second color (e.g., red), and a line of color components of the second color is followed by a line of color components of a third color (e.g., blue), and so on in repeating fashion. Thus, each of circuits 30, 31, and 32 includes a buffer with capacity to store a small number (i.e., five) samples of one color. Prior to the first wavelet transform stage, the samples are samples of incoming pixels. After the first wavelet transform stage (but prior to the second wavelet transform stage), the samples are transform coefficients resulting from the first wavelet transform stage.

Each of circuits 30, 31, and 32 also includes control logic which generates timing and control signals necessary for operation of circuits 33 and 39–47 and multiplexers 37 and 38 (e.g., control signals indicative of the end of each line written into the buffers).

In operation of the FIG. 5 circuit (in response to a block of input image data), circuit 34 receives the green color components of a block of data (on a line by line basis, from buffer 30 through multiplexer 38) and generates a set of wavelet transform coefficients in response thereto, then circuit 34 receives the red color components of a block of data (on a line by line basis, from buffer 31 through multiplexer 38) and generates a set of wavelet transform coefficients in response thereto, and then circuit 34 receives the blue color components of a block of data (on a line by line basis, from buffer 32 through multiplexer 38) and generates a set of wavelet transform coefficients in response thereto. The high pass output (three sets of transform coefficients) of the first wavelet transform stage is quantized in circuit 35, encoded in circuit 36, and output from the FIG. 5 circuit (through circuit 37) as "Encoded data$^1$" shown in FIG. 3. The low pass output (three sets of transform coefficients) of the first wavelet transform stage is passed through circuits 35, 36, and 37 (without being quantized or encoded) and written back to buffers 30, 31, and 32, respectively, for use in implementing the second wavelet transform stage.

Then, during a second wavelet transform stage, circuit 34 receives the coefficients in buffer 30 (via multiplexer 38) and generates a set of wavelet transform coefficients in response thereto, circuit 34 then receives the coefficients in buffer 31 (via multiplexer 38) and generates a set of wavelet transform coefficients in response thereto, and circuit 34 then receives the coefficients in buffer 32 (via multiplexer 38) and generates a set of wavelet transform coefficients in response thereto. The latter three sets of transform coefficients represent the result of the second wavelet transform stage. As will be explained in more detail below, some of the coefficients generated during the second wavelet transform are quantized in circuit 35, encoded in circuit 36, and then output from the FIG. 5 circuit (as "Encoded data$^1$" shown in FIG. 3), and the rest of the coefficients (those indicative of input image features having the lowest spatial frequency) are passed through circuits 35, 36, and 37 (without being quantized or encoded) and are written to memory 21.

The function of arbitration circuit 33 is to arbitrate between the three buffer circuits 30, 31, and 32 in the case that two or more of them simultaneously contend for access to circuit 34. Normally, such contention does not occur since the input data is "one hot" encoded (i.e., at most one color is valid during each clock cycle). However, since the last sample of each row of input data (the pixel data received by buffers 30, 31, and 32) is repeated as many times as required to make the number of samples per row equal to a multiple of four, two or more of circuits 30–32 can simultaneously contend for access to circuit 34. The reason that the last sample of each row (for each color) is repeated (as many times as required to make the number of pixels per row a multiple of four) is that every time decimation is performed, the subsequent bands have half the number of pixels per row. Making the input a multiple of four guarantees that for each stage of horizontal transform, there is an even number of pixels per row.

The last encoded coefficient for each band that is written to memory is also repeated as many times as required to make the number of encoded coefficients equal to a multiple of four. However, the reason for this is different than for the repetition discussed in the previous paragraph. Specifically, the last encoded coefficient for each band is repeated since data is written to the memory four words at a time. Thus, if the last encoded coefficient for each band is not repeated to make it a multiple of four, some of the data will never get written to the memory.

As noted, the low pass coefficients generated (in circuit 34) during the first wavelet transform stage pass, through circuits 35, 36, and 37, to buffers 30, 31, and 32. Circuit 34 then operates again to process the contents of buffers 30–32 (to implement the second wavelet transform stage). Of the coefficients resulting from the second wavelet transform stage, those that are not indicative of features having the lowest spatial frequency (i.e., those other than the coefficients comprising block LL) are quantized in circuit 35, the quantized coefficients then undergo entropy encoding in circuit 36, and the entropy encoded data passes through multiplexer 37 to the output of the compression circuit (i.e., as Encoded data$_1$ of FIG. 3).

Those coefficients (resulting from the second wavelet transform stage) that are indicative of features having the lowest spatial frequency (i.e., those comprising block LL) are neither quantized nor entropy encoded, and are written to memory 21 (on a row by row) basis. More specifically, memory 21 includes FIFO buffers and an array of storage locations. The data words to be written to memory 21 are transferred from multiplexer 37 to the FIFO buffers, and from the FIFO buffers to memory 21's array of storage locations. In a typical implementation, each transfer from the FIFO buffers (to memory 21's array of storage locations) requires that four words have been written to the FIFO buffers. For this reason, each of logic circuits 42, 44, and 46 is provided to generate (and assert to one of circuits 43, 45, and 47) a first set of control signals (in response to a second set of control signals received from one of circuits 30, 31, and 32). Each of circuits 30, 31, and 32 generates the second set of control signals to enable the blocks 42, 44, and 46 to repeat the last coefficient of a line (to be written to memory 21) as many times as required to make the number of coefficients in the augmented line equal to a multiple of four, and asserts the second set of control signals when a set of four coefficients is ready to be written to memory 21. The first set of control signals (asserted by each of circuits 42, 44, and 46) ensures that address generation circuits 43, 45, and 47 generate addresses for writing the coefficients of a line (or augmented line) to memory 21 only when a set of X coefficients is ready to be written to the FIFO buffers (where X is a multiple of four). Address generation circuits 43, 45, and 47 (which are coupled to the FIFO buffers, and operate in response to control signals generated by circuits 30, 31, 32, 42, 44, and 46) are configured to generate addresses (identified as "addr_g," "addr_r," and "addr_b" in FIG. 5) for use in writing coefficients (for each of the green, red, and blue color components, respectively) from multiplexer 37 to appropriate locations in memory 21.

Counters 39, 40, and 41 count the actual number of coefficients (for the green, red, and blue color components, respectively) in each line of transform coefficients (in one of circuits 30, 31, and 32) that is indicative of features having the lowest spatial frequency (i.e., each line of the coefficients comprising block LL to be written from buffer circuits 30, 31, and 32 to memory 21). Counters 39, 40, and 41 assert the resulting count signals to vertical transform circuit 22 for use in computing the vertical wavelet transform.

Figure 6:
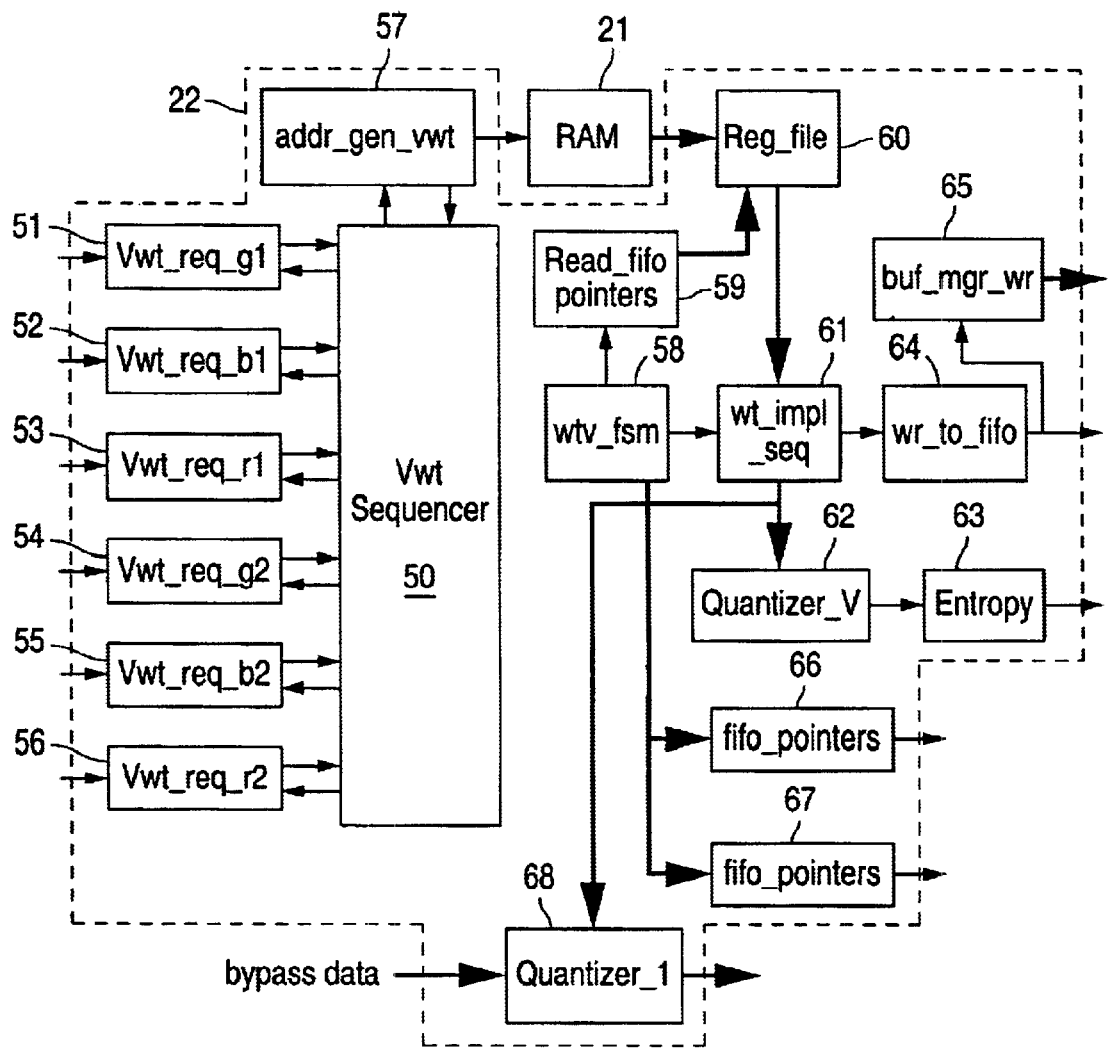
FIG. 6 is a block diagram of a preferred implementation of circuit 22 of the FIG. 3 apparatus (with memory 21 of FIG. 3).

FIG. 6 is a block diagram of a preferred implementation of circuit 22 of the FIG. 3 apparatus (with memory 21 of FIG. 3). The FIG. 6 circuit comprises logic circuits 51, 52, 53, 54, 55, 56, address generation circuits 57 and 65, sequencer 50, set of registers 60, control signal generation circuits 58, 59, 64, 66, and 67, wavelet transform circuit 61, quantizers 62 and 68, and entropy encoder 63, connected as shown.

Since the FIG. 6 circuit is capable of performing two vertical wavelet transform stages on each of three blocks of coefficients stored in memory 21 (one block for each of the three color components), the FIG. 6 circuit has an operating mode in which wavelet transform circuit 61 performs six vertical transforms on data read (on a column by column basis) from memory 21 (where the data has been written by the FIG. 5 circuit into memory 21 on a row by row basis). Columns of coefficients to be vertically transformed are read from memory 21 into registers 60. The vertical wavelet transforms are performed one band at a time, one color at a time, in an interleaved fashion. The interleaving order is not fixed and it depends on the order in which requests are generated by circuits 51–56. In one example of interleaving, after computing one line of the first vertical transform for green, the inventive circuit would compute a line of a second vertical transform for red.

In a preferred implementation, columns of coefficients to be vertically transformed are read from memory 21 into registers 60 as follows. Five rows (enough to compute one line of the vertical wavelet transform) are read from memory 21, in blocks (4×5 blocks) comprising 20 pixels each. Four transform coefficients are computed from each 4×5 block. Then, the next block is read until the transform for the entire line is computed. Circuit 22 performs filtering along the vertical direction to get one row of vertically transformed data. This is done to reduce the amount of memory used. The storage needed in the inventive system is less than in the prior art owing to the smaller length of the filters employed.

Circuit 61 sends an end of line signal to logic circuit 51 at the end of each first stage transform of a line of "green" coefficients, an end of line signal to logic circuit 52 at the end of each first stage transform of a line of "blue" coefficients, an end of line signal to logic circuit 53 at the end of each first stage transform of a line of "red" coefficients, an end of line signal to logic circuit 54 at the end of each second stage transform of a line of "green" coefficients, an end of line signal to logic circuit 55 at the end of each second stage transform of a line of "blue" coefficients, and an end of line signal to logic circuit 56 at the end of each second stage transform of a line of "red" coefficients. Each time that one of circuits 51–56 receives two end of line signals, it asserts (to sequencer 50) a request for granting access to the vertical wavelet transform block in order to compute another line of transform for that particular band. Sequencer 50 asserts control signals to address generation circuit 57 in response to granting such requests, and in response, circuit 57 asserts addresses and read requests to memory 21 (to cause the appropriate data to be read from memory 21 to one or more registers of circuit 60). Sequencer 60 keeps track of which line must be read from memory 21 and other address details.

Control signal generation circuit 58 generates (and asserts to circuit 59) the required control signals for reading data from registers within circuit 60. In response to such control signals, circuit 59 causes wavelet transform circuit 61 to receive the appropriate line of data from circuit 60. Circuit 61 performs a "first stage" or "second stage" vertical wavelet transform on each line of coefficients received from circuit 60.

The coefficients resulting from each "first stage" vertical wavelet transform are written to memory 21. In response to control signals asserted by circuit 61, logic circuit 64 asserts control signals to FIFO buffers and to address generation circuit 65, and circuits 66 and 67 generate FIFO pointers (for use by memory 21 during the writing of data from circuit 61 to memory 21). Note, the FIFO buffers are typically not in memory 21. Instead, data is typically written to FIFO buffers, and from the FIFO buffers to memory 21.

In response, circuit 65 asserts addresses to memory 21 and the coefficients resulting from each "first stage" transform are written to the appropriate storage locations in memory 21. Specifically, in order to write coefficients resulting from each "first stage" transform to memory 21, quantizer 68 selects either LLLL data or LL data (depending on the value of the control signal "bypass_data" asserted by circuit 58). In case the user wants to perform only two stages of horizontal transform and no vertical transform, "bypass_data" selects LL data and circuit 68 quantizes that. Otherwise, "bypass_data" selects LLLL data, which is quantized by circuit 58. No entropy encoding is performed on LL or LLLL data.

LLL data is not quantized. It is written to the memory 21 as soon as it comes out of circuit 61.

In typical operation of the FIG. 6 circuit, those coefficients resulting from the "second stage" vertical wavelet (which are to be quantized and entropy encoded) are asserted from circuit 61 to quantizer 62 (in which they are quantized), and from quantizer 62 to entropy encoder 63 (in which they undergo entropy encoding).

Preferably, the FIG. 6 circuit is implemented so as to be operable in a mode in which circuit 61 passes through the coefficients it receives to quantizer 68 (without changing them), and quantizer 68 passes through the coefficients (without changing them) to an output node of the FIG. 6 circuit.

Preferably, quantization circuits 35, 62, and 68 are controllable to perform scalar quantization, with quantization step size that depends on user-selected setting. Preferably, the quantization step size is programmable, with eight quantization step sizes available for all subbands. After scalar quantization, deadzone quantization is preferably performed on the highpass bands (namely the H, LH, LLH, and LLLH data). After deadzone quantization, all the quantized coefficients are preferably shifted toward zero by an amount equal to the deadzone threshold that was applied.

Entropy encoding circuits 36 and 63 replace coefficients with code words, and each can implement Huffman encoding. To achieve compression, the entropy encoding typically uses shorter code words for frequently occurring coefficients and longer code words for infrequently occurring coefficients. Based on statistics obtained from natural images, the inventors have determined that a large fraction of the "high pass" coefficients resulting from multi-stage wavelet transforms (coefficients indicative of image features having relatively high spatial frequency; not those indicative of features having the lowest spatial frequency such as those of block LLLL of FIG. 4) have zero magnitude or magnitude that is close to zero. Applying deadzone quantization after scalar quantization further increases the number of zeros. Thus the inventors prefer to perform entropy encoding on such "high pass" coefficients with zero coefficients (the most frequently occurring symbol) replaced by the shortest code word. The encoding applied to a nonzero coefficient depends on whether the coefficient is short or long.

The following example illustrates a preferred encoding scheme for one setting in which each quantized coefficient input to the entropy encoder is an eight-bit word indicative of a "twos complement" number:

Class 1: all zero coefficients are replaced by a one bit zero code word. This code provides compression by a factor of eight since one byte indicative of zero is replaced by a single "zero" bit;

Class 2: if the coefficient's magnitude is less than or equal to eight, it is classified as "short." The code word for a short coefficient is "10" followed by the sign of the coefficient followed by the three-bit magnitude minus one. Unless "one" is subtracted from the magnitude, the code word will never be a short word followed by all zeros which means that we never use one short code word. During decoding, the magnitude of all non-negative numbers is increased by one to compensate for subtraction of one during encoding; and Class 3: if the coefficient's magnitude is greater than eight, it is classified as "long." The code word for a long coefficient is "11" followed by the sign and the seven-bit magnitude minus "one."

In the described preferred encoding scheme, long coefficients are actually replaced with code words of greater size. However, since the bulk of the coefficients will typically be zero, the net result of the encoding of all the coefficients resulting from a typical block of image data is compression (rather than expansion).

The described preferred encoding scheme has low complexity and allows fast decoding with a simple decoder.

In other embodiments, each quantized word is an N-bit word indicative of a twos complement number, where N is an integer which can (but need not) be equal to eight. The encoder is designed to encode the N-bit quantized words. Preferably, the quantizer and encoder are implemented so that N can have any selected one of a number of different values, and the encoding is performed in a manner suitable for the selected value of N. For example, the encoding scheme can replace all zero coefficients by a one bit zero code word, and can replace all other quantized words by:

one bit "A" followed by the sign of the quantized word followed by an X-bit magnitude of the "quantized word minus one" (where the quantized word has relatively few bits), or two bits "BC" followed by the sign of the quantized word followed by a Y-bit magnitude of the "quantized word minus one" (where the quantized word has a relatively large number of bits, and a magnitude greater than a threshold magnitude) or two bits "DE" followed by the sign of the quantized word followed by a Z-bit magnitude of the "quantized word minus one" (where the quantized word has a relatively large number of bits and a magnitude less than or equal to the threshold magnitude).

Table 1 specifies examples of the encoding scheme set forth in the preceding paragraph:

TABLE 1

| number of bits | A | BC | DE | X | Y | Z |
|---|---|---|---|---|---|---|
| 8 |   | 11 | 10 |   | 7 | 3 |
| 7 |   | 11 | 10 |   | 6 | 2 |
| 6 |   | 11 | 10 |   | 5 | 1 |
| 5 | 1 |   |   | 4 |   |   |
| 4 | 1 |   |   | 3 |   |   |
| 3 | 1 |   |   | 2 |   |   |
| 2 | 1 |   |   | 1 |   |   |

The coded data stream output from circuit 22 is transmitted through (or stored within) a transmission or storage means, and then received (or read from storage) by an image data decompression circuit. The image data decompression circuit performs the inverse operations to those performed by the image data compression apparatus to reconstruct the original image data without loss of essential features. It is contemplated that in some embodiments, both the compression and decompression circuitry are implemented in an optical scanner.

In some preferred embodiments of the inventive method and apparatus, each wavelet transform (e.g., each wavelet transform performed by circuit 34 of FIG. 5 and circuit 61 of FIG. 6) is a "3–5" wavelet transform. Preferably the 3–5 wavelet transform has the following coefficients: −1, 2, 6, 2, and −1 (for generating a vector indicative of relatively low spatial frequency content from a line of samples); and −2, 4, and −2 (for generating a vector indicative of relatively high spatial frequency content from the same line of samples). When implementing such a 3–5 wavelet transform, the matrix of coefficients shown in FIG. 7 is employed (e.g., by circuit 34 of FIG. 5 or circuit 61 of FIG. 6). When such a 3–5 wavelet transform has been performed during generation of compressed data, the matrix of coefficients shown in FIG. 8 can be employed (by an apparatus for performing decompression on the compressed data) to perform the inverse of the 3–5 wavelet transform.

Multiplication of the forward transform of FIG. 7 with the inverse transform of FIG. 8 leads to the identity matrix multiplied by a factor of 32. Accordingly, the reconstructed data generated during decompression should be divided by a factor of 32. Alternatively, one or both of the forward transform of FIG. 7 and the inverse transform of FIG. 8 is multiplied by a scaling factor to avoid undesired scaling of the reconstructed data.

In some embodiments of the invention, vertical and horizontal circuits (first and second circuits) are configured to operate recursively on data (with any number of cycles), in the sense that one of the circuits (during each of the cycles) operates on a subset of wavelet transform coefficients generated by the other (after such other circuit has written the subset to a memory). Consider, for example, the FIG. 9 embodiment, which includes imaging system 119 (configured to generated image data to be compressed), random access memory (RAM) 121, first circuit 120, second circuit 122, transmission means 123, and decompression circuit 124. First circuit 120 is coupled to memory 121 and configured to perform at least two (typically, exactly two) consecutive horizontal wavelet transform stages on a block of image data (from system 119) to generate coefficients (in a first cycle), to quantize and entropy encode at least a first block of the coefficients which are indicative of relatively high spatial frequency information ("high frequency coefficients") to generate compressed data (identified as "Encoded data$_1$" in FIG. 9), and to write to memory 121 (on a row by row basis) a second block of the coefficients which are indicative of relatively low spatial frequency information ("low frequency coefficients"). Second circuit 122 is coupled to memory 121 and configured to read columns of the low frequency coefficients from memory 121, to perform a vertical wavelet transform on the low frequency coefficients (in a second cycle) to generate additional coefficients, to quantize and entropy encode at least a first block ("LLH" coefficients) of the additional coefficients which are indicative of relatively high spatial frequency information of the low frequency coefficients to generate compressed data (identified as "Encoded data$_2$" in FIG. 9), and to write to memory 121 (on a column by column basis) a second block ("LLL" coefficients) of the additional coefficients which are indicative of relatively low spatial frequency information of the low frequency coefficients. First circuit 120 is configured to operate (in a third cycle) to read rows of the LLL coefficients from memory 121, perform at least one horizontal wavelet transform on the LLL coefficients to generate further coefficients, quantize and entropy encode at least a first block ("LLLH" coefficients) of the further coefficients which are indicative of relatively high spatial frequency information of the LLL coefficients to generate compressed data (identified as "Encoded data$_1$" in FIG. 9), and quantize a second block ("LLLL" coefficients) of the further coefficients which are indicative of relatively low spatial frequency information of the LLL coefficients to generate compressed data (also identified as "Encoded data$_1$" in FIG. 9). The data (Encoded data$_1$ and Encoded data$_2$) generated in the first, second, and third cycles, which is compressed data indicative of the original image data, is transmitted by transmission means 123 to decompression circuit 124. The transmitted, compressed data undergoes decompression in circuit 124.

Preferably, the FIG. 9 apparatus is a portion of a document scanner, and imaging system 119 includes hardware for generating image data indicative of a document.

Various modifications in the structure and method of operation of the described embodiments are within the scope and spirit of this invention, and will be apparent to those skilled in the art. Although the invention has been described in connection with specific preferred embodiments, the invention as claimed should not be unduly limited to such specific embodiments.

What is claimed is:

1. An apparatus for performing data compression by performing a multi-stage wavelet transform on a block of image data to generate coefficients, quantizing at least some of the coefficients to generate quantized coefficients, and performing entropy encoding on at least some of the quantized coefficients to generate compressed data, said apparatus comprising:

a random access memory;

a first circuit coupled to the memory and configured to perform a multi-stage horizontal wavelet transform on the block of image data to generate at least a first set of coefficients and a second set of coefficients, wherein the multi-stage horizontal wavelet transform comprises at least two consecutive horizontal wavelet transform stages, the first set of coefficients is indicative of relatively high spatial frequency information of the block of the image data, the second set of coefficients is indicative of relatively low spatial frequency information of the block of the image data, and the first circuit is configured to quantize at least some coefficients of the first set to generate a set of quantized coefficients, to entropy encode the set of quantized coefficients to generate a first set of encoded coefficients, and to write the second set of coefficients to the memory on a row by row basis; and a second circuit, coupled to the memory, and configured to read coefficients of the second set from the memory, to perform at least one vertical wavelet transform stage on the second set of coefficients to generate a third set of coefficients, to quantize at least some of the coefficients of the third set to generate a second set of quantized coefficients, and to entropy encode the second set of quantized coefficients to generate a second set of encoded coefficients, wherein the first set of encoded coefficients and the second set of encoded coefficients at least partially determine the compressed data.

2. The apparatus of claim 1, wherein the second circuit is configured to perform a two stage wavelet transform, comprising two consecutive vertical wavelet transform stages, on the second set of coefficients to generate the third set of coefficients.

3. The apparatus of claim 2, wherein the multi-stage horizontal wavelet transform comprises two consecutive horizontal wavelet transform stages in which the first circuit generates the first set, the second set, and a fourth set of the coefficients, wherein each of the first set and the fourth set is indicative of relatively high spatial frequency information of the image data and the second set is indicative of relatively low spatial frequency information of the image data, the first circuit is configured to quantize at least some coefficients of the first set and the fourth set to generate the first set of quantized coefficients, and wherein the first set of encoded coefficients and the second set of encoded coefficients determine the compressed data.

4. The apparatus of claim 1, wherein the first circuit is configured to entropy encode the first set of quantized coefficients in such a manner that the first set of encoded coefficients can be rapidly decompressed.

5. The apparatus of claim 4, wherein each coefficient of the first set of quantized coefficients is a multi-bit word indicative of a twos complement number, and the first circuit is configured to entropy encode the first set of quantized coefficients by replacing each zero coefficient thereof with a one bit zero code word, replacing each coefficient thereof having magnitude not greater than a threshold value with a first binary value followed by the sign of the coefficient followed by a Z-bit magnitude of said coefficient minus one, and replacing each coefficient thereof having magnitude greater than the threshold value with a second binary value followed by the sign of the coefficient followed by a Y-bit magnitude of said coefficient minus one.

6. The apparatus of claim 4, wherein each coefficient of the first set of quantized coefficients is an eight-bit word indicative of a twos complement number, and the first circuit is configured to entropy encode the first set of quantized coefficients by replacing each zero coefficient thereof with a one bit zero code word, replacing each coefficient thereof having magnitude not greater than eight with a binary value 10 followed by the sign of the coefficient followed by a three-bit magnitude of said coefficient minus one, and replacing each coefficient thereof having magnitude greater than eight with a binary value 11 followed by the sign of the coefficient followed by a seven-bit magnitude of said coefficient minus one.

7. The apparatus of claim 1, wherein each stage of the multi-stage horizontal wavelet transform is a 3–5 wavelet transform.

8. The apparatus of claim 7, wherein the 3–5 wavelet transform is determined, to within a scaling factor, by first transform coefficients for generating from each row of the block of image data a vector having relatively low spatial frequency content, and second transform coefficients for generating from said each row of the block of image data another vector having relatively high spatial frequency content, wherein the first transform coefficients are −1, 2, 6, 2, and −1 and the second transform coefficients are −2, 4, and −2.

9. A method for compressing image data to generate compressed data, including the steps of:

(a) performing a multi-stage horizontal wavelet transform on a block of the image data to generate at least a first set of coefficients and a second set of coefficients, wherein the multi-stage horizontal wavelet transform comprises at least two consecutive horizontal wavelet transform stages, wherein the first set is indicative of relatively high spatial frequency information of the block of the image data and the second set is indicative of relatively low spatial frequency information of the block of the image data;

(b) quantizing at least some coefficients of the first set to generate a first set of quantized coefficients, and entropy encoding the first set of quantized coefficients to generate a first set of encoded coefficients;

(c) writing the second set of coefficients to a memory on a row by row basis;

(d) reading coefficients of the second set from the memory, and performing at least one vertical wavelet transform stage on the coefficients of the second set that have been read from the memory, to generate a third set of coefficients; and (e) quantizing at least some of the third set of coefficients to generate a second set of quantized coefficients, and entropy encoding the second set of quantized coefficients to generate a second set of encoded coefficients, wherein the first set of encoded coefficients and the second set of encoded coefficients at least partially determine the compressed data.

10. The method of claim 9, wherein step (d) includes the step of performing a two stage vertical wavelet transform on said coefficients of the second set to generate the third set of coefficients, said two stage wavelet transform comprising two consecutive vertical wavelet transform stages.

11. The method of claim 10, wherein step (a) includes the step of performing two consecutive horizontal wavelet transform stages to generate the first set, the second set, and a fourth set of the coefficients, wherein each of the first set of coefficients and the fourth set of coefficients is indicative of relatively high spatial frequency information of the block of the image data and the second set is indicative of relatively low spatial frequency information of the block of the image data, wherein step (b) includes the step of quantizing the first set and the fourth set to generate the first set of quantized coefficients, and wherein the first set of encoded coefficients and the second set of encoded coefficients determine the compressed data.

12. The method of claim 9, wherein each stage of the multi-stage horizontal wavelet transform is a 3–5 wavelet transform.

13. The method of claim 12, wherein the 3–5 wavelet transform is determined, to within a scaling factor, by first transform coefficients for generating from each row of the block of image data a vector having relatively low spatial frequency content, and second transform coefficients for generating from said each row of the block of image data another vector having relatively high spatial frequency content, wherein the first transform coefficients are −1, 2, 6, 2, and −1, and the second transform coefficients are −2, 4, and −2.

14. The method of claim 9, wherein each coefficient of the first set of quantized coefficients is a multi-bit word indicative of a twos complement number, and wherein step (b) includes the step of:

entropy encoding the first set of quantized coefficients by replacing each zero coefficient thereof with a one bit zero code word, replacing each coefficient thereof having magnitude not greater than a threshold value with a first binary value followed by the sign of the coefficient followed by a Z-bit magnitude of said coefficient minus one, and replacing each coefficient thereof having magnitude greater than the threshold value with a second binary value followed by the sign of the coefficient followed by a Y-bit magnitude of said coefficient minus one.

15. The method of claim 9, wherein each coefficient of the first set of quantized coefficients is an eight-bit word indicative of a twos complement number, and wherein step (b) includes the step of:

entropy encoding the first set of quantized coefficients by replacing each zero coefficient thereof with a one bit zero code word, replacing each coefficient thereof having magnitude not greater than eight with a binary value 10 followed by the sign of the coefficient followed by a three-bit magnitude of said coefficient minus one, and replacing each coefficient thereof having magnitude greater than eight with a binary value 11 followed by the sign of the coefficient followed by a seven-bit magnitude of said coefficient minus one.

16. An apparatus for performing data compression by performing a multi-stage wavelet transform on a block of image data to generate coefficients, quantizing at least some of the coefficients to generate quantized coefficients, and performing entropy encoding on at least some of the quantized coefficients to generate compressed data, said apparatus comprising:

a random access memory;

a first circuit coupled to the memory and configured to perform a multi-stage horizontal wavelet transform on the block of image data to generate at least a first set of coefficients and a second set of coefficients, wherein the multi-stage horizontal wavelet transform comprises at least two consecutive horizontal wavelet transform stages, the first set of coefficients is indicative of relatively high spatial frequency information of the block of the image data, the second set of coefficients is indicative of relatively low spatial frequency information of the block of the image data, and the first circuit is configured to quantize at least some coefficients of the first set to generate a set of quantized coefficients, to entropy encode the set of quantized coefficients to generate a first set of encoded coefficients, and to write the second set of coefficients to the memory on a row by row basis; and a second circuit, coupled to the memory, and configured to read coefficients of the second set from the memory, to perform at least one vertical wavelet transform stage on the coefficients of the second set read from the memory to generate a third set of coefficients and a fourth set of coefficients, and to quantize at least some of the coefficients of the third set to generate a second set of quantized coefficients, to entropy encode the second set of quantized coefficients to generate a second set of encoded coefficients, and to write the fourth set of coefficients to the memory, wherein the first circuit is configured to read coefficients of the fourth set from the memory on a row by row basis, to perform at least one horizontal wavelet transform stage on the coefficients of the fourth set read from the memory to generate a fifth set of coefficients, to quantize at least some of the coefficients of the fifth set to generate a third set of quantized coefficients, and to entropy encode the third set of quantized coefficients to generate a third set of encoded coefficients, wherein the first set of encoded coefficients, the second set of encoded coefficients, and the third set of encoded coefficients at least partially determine the compressed data.

17. The apparatus of claim 16, wherein the first circuit is configured to entropy encode the first set of quantized coefficients in such a manner that the first set of encoded coefficients can be rapidly decompressed.

18. The apparatus of claim 17, wherein each coefficient of the first set of quantized coefficients is a multi-bit word indicative of a twos complement number, and the first circuit is configured to entropy encode the first set of quantized coefficients by replacing each zero coefficient thereof with a one bit zero code word, replacing each coefficient thereof having magnitude not greater than a threshold value with a first binary value followed by the sign of the coefficient followed by a Z-bit magnitude of said coefficient minus one, and replacing each coefficient thereof having magnitude greater than the threshold value with a second binary value followed by the sign of the coefficient followed by a Y-bit magnitude of said coefficient minus one.

19. The apparatus of claim 17, wherein each coefficient of the first set of quantized coefficients is an eight-bit word indicative of a twos complement number, and the first circuit is configured to entropy encode the first set of quantized coefficients by replacing each zero coefficient thereof with a one bit zero code word, replacing each coefficient thereof having magnitude not greater than eight with a binary value 10 followed by the sign of the coefficient followed by a three-bit magnitude of said coefficient minus one, and replacing each coefficient thereof having magnitude greater than eight with a binary value 11 followed by the sign of the coefficient followed by a seven-bit magnitude of said coefficient minus one.

20. The apparatus of claim 16, wherein each stage of the multi-stage horizontal wavelet transform is a 3–5 wavelet transform.

21. A method for compressing image data to generate compressed data, including the steps of:
(a) performing a multi-stage horizontal wavelet transform on a block of the image data to generate at least a first set of coefficients and a second set of coefficients, wherein the multi-stage horizontal wavelet transform comprises at least two consecutive horizontal wavelet transform stages, wherein the first set of coefficients is indicative of relatively high spatial frequency information of the block of the image data and the second set of coefficients is indicative of relatively low spatial frequency information of the block of the image data;
(b) quantizing at least some coefficients of the first set to generate a first set of quantized coefficients, and entropy encoding the first set of quantized coefficients to generate a first set of encoded coefficients;
(c) writing the second set of coefficients to a memory on a row by row basis;
(d) reading coefficients of the second set from the memory, and performing at least one vertical wavelet transform stage on the coefficients of the second set read from the memory, to generate a third set of coefficients and a fourth set of coefficients;
(e) quantizing at least some of the third set of coefficients to generate a second set of quantized coefficients, and entropy encoding the second set of quantized coefficients to generate a second set of encoded coefficients;
(f) writing the fourth set of coefficients to the memory;
(g) reading coefficients of the fourth set from the memory on a row by row basis, and performing at least one vertical wavelet transform stage on the coefficients of the fourth set read from the memory, to generate a fifth set of coefficients;
(e) quantizing at least some of the fifth set of coefficients to generate a third set of quantized coefficients, and entropy encoding the third set of quantized coefficients to generate a third set of encoded coefficients, wherein the first set of encoded coefficients, the second set of encoded coefficients, and the third set of encoded coefficients at least partially determine the compressed data.

22. The method of claim 21, wherein each stage of the multi-stage horizontal wavelet transform is a 3–5 wavelet transform.

23. An apparatus for performing a multi-stage wavelet transform on image data to generate transformed coefficients, said apparatus comprising:
a random access memory;
a first circuit coupled to the memory and configured to perform a multi-stage horizontal wavelet transform on a block of the image data to generate at least a first set of coefficients and a second set of coefficients, wherein the multi-stage horizontal wavelet transform comprises at least two consecutive horizontal wavelet transform stages, the first set of coefficients is indicative of relatively high spatial frequency information of the block of the image data, and the second set of coefficients is indicative of relatively low spatial frequency information of the block of the image data, and the first circuit is configured to write the second set of coefficients to the memory on a row by row basis; and
a second circuit, coupled to the memory, and configured to read coefficients of the second set from the memory, to perform at least one vertical wavelet transform stage on the second set of coefficients read from the memory to generate a third set of coefficients and a fourth set of coefficients, wherein the first set of coefficients, the third set of coefficients, and the fourth set of coefficients at least partially determine the transformed coefficients.

24. The apparatus of claim 23, wherein each stage of the multi-stage horizontal wavelet transform is a 3–5 wavelet transform.

25. A method for performing a multi-stage wavelet transform on image data to generate transformed coefficients, said method including the steps of:
(a) performing a multi-stage horizontal wavelet transform on a block of the image data to generate at least a first set of coefficients and a second set of coefficients, wherein the multi-stage horizontal wavelet transform comprises at least two consecutive horizontal wavelet transform stages, wherein the first set of coefficients is indicative of relatively high spatial frequency information of the block of the image data and the second set of coefficients is indicative of relatively low spatial frequency information of the block of the image data;
(b) writing the second set of coefficients to a memory on a row by row basis; and
(c) reading coefficients of the second set from the memory, and performing at least one vertical wavelet transform stage on the coefficients of the second set read from the memory, to generate a third set of coefficients and a fourth set of coefficients, wherein the first set of coefficients, the third set of coefficients, and the fourth set of coefficients at least partially determine the transformed coefficients.

26. The method of claim 25, wherein each stage of the multi-stage horizontal wavelet transform is a 3–5 wavelet transform.

* * * * *